United States Patent

Esselborn et al.

[11] Patent Number: 5,990,245
[45] Date of Patent: Nov. 23, 1999

[54] α, ω-POLYMETHACRYLATE GLYCOLS, METHODS FOR THEIR SYNTHESIS AND THEIR USE FOR THE PREPARATION OF POLYMERS, PARTICULARLY POLYURETHANES AND POLYESTERS

[75] Inventors: Eberhard Esselborn, Essen; Jürgen Fock, Düsseldorf, both of Germany

[73] Assignee: Th. Goldschmidt AG, Essen, Germany

[21] Appl. No.: 08/936,154

[22] Filed: Sep. 24, 1997

Related U.S. Application Data

[63] Continuation of application No. 08/645,938, May 14, 1996, and application No. 08/234,699, Apr. 28, 1994, abandoned.

[30] Foreign Application Priority Data

Apr. 29, 1993 [DE] Germany ............... 43 14 111

[51] Int. Cl.[6] .................................... C08F 8/14
[52] U.S. Cl. .............. 525/330.6; 525/384; 526/222; 526/224; 526/319; 526/320
[58] Field of Search ................... 525/330.6, 384; 526/222, 224

[56] References Cited

U.S. PATENT DOCUMENTS

| | | | |
|---|---|---|---|
| 4,056,559 | 11/1977 | Lewis | 526/212 |
| 4,103,093 | 7/1978 | Lewis | 560/205 |
| 4,208,313 | 6/1980 | Lewis | 526/323.1 |
| 4,351,924 | 9/1982 | Andrews | 525/330.6 |
| 4,357,435 | 11/1982 | Lewis | 524/239 |
| 4,501,860 | 2/1985 | Campbell | 525/359.4 |
| 4,791,221 | 12/1988 | Gabillet | 560/217 |

OTHER PUBLICATIONS

Markromolekulare Stoffe, Hert Bartl, et al, 1987, 3 pages.
Functionalization of PMMA by Afuntional "Iniferter", G. Clouet, 1989, 15 Pgs.
Telechelic Polymers, J. Rietveld, et al, 1983, 5 pages.

*Primary Examiner*—Fred Zitomer
*Attorney, Agent, or Firm*—Frommer Lawrence & Haug LLP

[57] ABSTRACT

α, ω-polymethacrylate glycols of the general formula

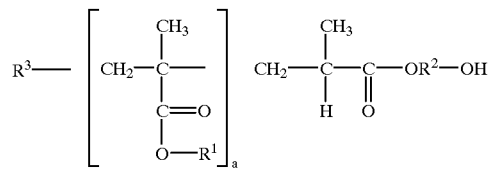

are prepared and a method for their synthesis and their use as only or partial glycol component for the preparation of polyesters and polyurethanes and for the modification of alkyd and epoxide resins are described.

2 Claims, No Drawings

α, ω-POLYMETHACRYLATE GLYCOLS, METHODS FOR THEIR SYNTHESIS AND THEIR USE FOR THE PREPARATION OF POLYMERS, PARTICULARLY POLYURETHANES AND POLYESTERS

This is a continuation of application Ser. Nos. 08/645,938 filed May 14, 1996 and 08/234,699, filed Apr. 28, 1994, abandoned.

FIELD OF INVENTION

The invention relates to α, ω-polymethacrylate glycols with two terminal hydroxyl groups. The invention furthermore relates to a method for the synthesis of such α, ω-polymethacrylate glycols, as well as the preparation of polymers, particularly polyurethanes and polyesters, where the reactive starting materials are said glycols. The invention also relates to modifying alkyd and epoxide resins using the inventive glycols as modifiers.

BACKGROUND INFORMATION AND PRIOR ART

The synthesis of polymethacrylates with terminal functional groups and, in particular, with terminal hydroxyl groups, was attempted in various ways in recent years, since such compounds are of particular interest for the preparation of block copolymers, for example, for the preparation of polyesters or polyurethanes.

In particular, attempts have been made to obtain such polymethacrylate glycols by way of group transfer polymerization. However, extremely high purity of the reagents used and the strict exclusion of air moisture are a prerequisite for carrying out the group-transfer reaction. By using initiators, which are listed in Houben-Weyl, Methoden der organischen Chemie (Methods of Organic Chemistry), volume E 20/Part 1, Table 18, pages 158 ff. and which can be synthesized only at great cost, only monofunctional polymers are obtained, which have a narrow molecular weight distribution. The synthesis of α, ω difunctional polymers by means of this, so far, only method is not possible or possible only incompletely at great expense (D. Y. Sogah and O. W. Webster, J. Polym. Sci., Polym. Lett. Ed. 21, 927 (1983)).

Another way of synthesizing α, ω-terminated polymethacrylates was recently described using thiuram disulfides, which contain the hydroxyethyl groups. The synthesis was carried out according to the so-called "Iniferter" technique (initiator, transfer agent, terminator). Admittedly, the products obtained had a functionality, which comes close to the desired 2. However, the products, due to their high sensitivity to hydrolytic and thermal effects, can be used only to a limited degree (C. P. Reghunadham et al., J. Polymer Sci., part A: Pol. Chem. 27, 1795 (1989)).

The present invention is concerned with the technical problem of synthesizing such α, ω-polymethacrylate glycols readily, the content of polymethacrylates with a functionality of less than 2 or more than 2 being, as far as possible, 0.

OBJECT OF THE INVENTION

An object of the present invention is α, ω-polymethacrylate glycols. Another object of the invention is a method of synthesizing the inventive glycols. Yet another object of invention is the preparation of polymers with inventive glycols as reactive starting materials. The glycols are also utilized in modifying alkyd and epoxide resins. The inventive α, ω-polymethacrylate glycols have the general formula

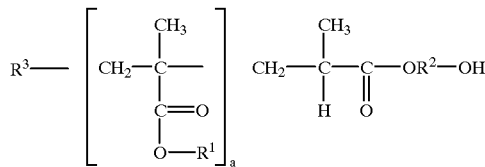

wherein
$R^1$ is an optionally halogenated, alkyl group with 1 to 10 carbon atoms,
$R^2$
(1) is a divalent, aliphatic, optionally unsaturated hydrocarbon group with 2 to 20 carbon atoms, a cycloaliphatic hydrocarbon group with 5 to 10 carbon atoms or an aliphatic-aromatic hydrocarbon group with 8 to 20 carbon atoms,
(2) a divalent, aliphatic ether group —$R^5$—O—$R^6$, the $R^5$ and $R^6$ groups of which together have 4 to 20 carbon atoms, or
(3) a polyether group of the general formula —$(C_nH_{2n}O)_m$—$C_pH_{2p}$, wherein the subscript n has a value of 2 to 4, the subscript m a value of not less than 1 and the subscript p a value of 2, 3 or 4,
$R^3$ is a group of a known chain-length regulator, which has a terminal hydroxyl group, and
a has a value of not less than 4.
$R^1$ preferably is a methyl, butyl or 2-ethylhexyl group,
$R^2$ can have various meanings and preferably is
(1) a divalent alkylene group with 2 to 12 and particularly 2 to 6 carbon atoms, a cyclohexyl group or a xylylene group,
(2) a divalent aliphatic ether group, particularly the —$CH_2$—$CH_2O$—$CH_2$—$CH_2$— group, or
(3) a polyether group having the formula —$(C_nH_{2n}O)_m$—$C_pH_{2p}$—, wherein n=2 to 2.5, m=5 to 100 and p=3.
It is of particular importance that the $R^3$ group is a group of a known chain-length regulator, which has a terminal hydroxyl group. Preferably the $R^3$ group represents the —S—$CH_2CH_2$—OH, —S—$CH_2CH_2CH_2CH_2$—OH, —S—$CH_2CH_2CH_2CH_2CH_2CH_2$—OH or —S—$CH_2$—$C_6H_4$—$CH_2OH$ group.

Examples of inventive compounds are

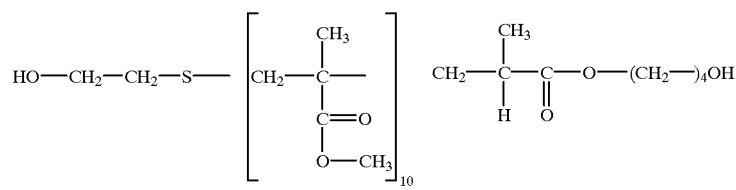

-continued

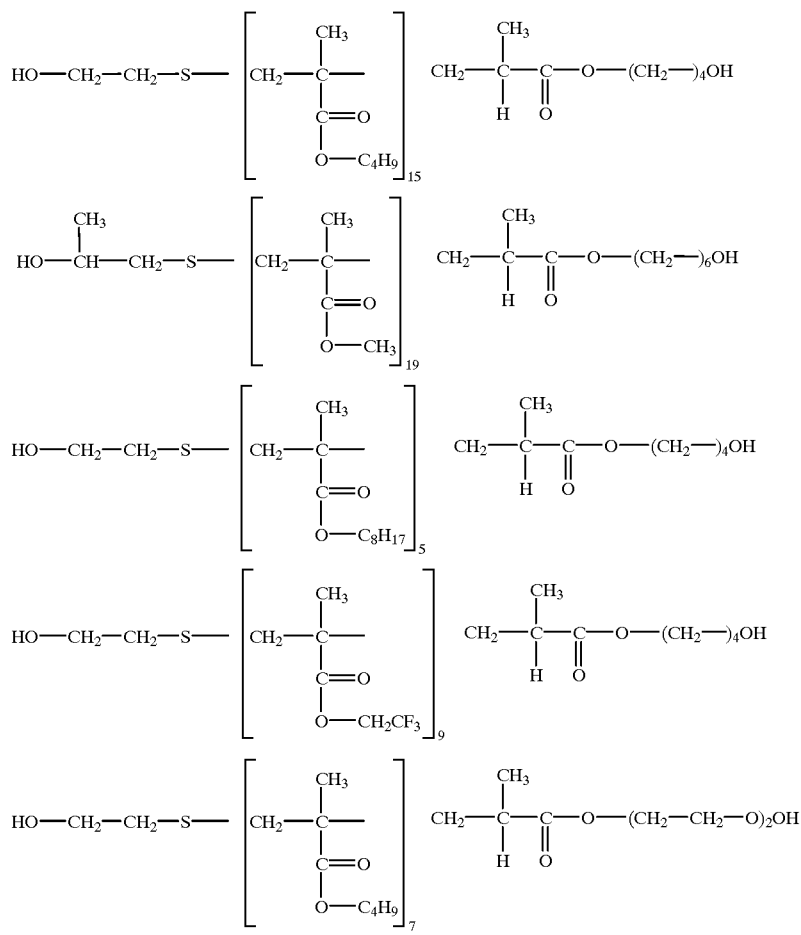

The method for the synthesis of the inventive compounds is characterized in that, polymethacrylate esters of the general formula,

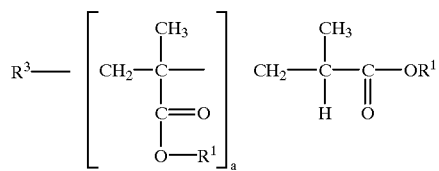

which are obtained by free radical polymerization in the presence of chain-length regulator and wherein the $R^1$ and the $R^3$ groups and the subscript a have the meanings already given, are reacted with a glycol having the formula HO—$R^2$—OH at temperatures of 70° to 140° C., optionally in the presence of a solvent, with the addition of known, non-basic transesterification catalysts in a molar ratio of polymethacrylate ester to HO—$R^2$—OH of 1:1 to 1:10, and the excess of unreacted glycol is removed by known methods, such as distillation or by washing it out with a solvent, in which the glycol is soluble and the polymer is insoluble.

Surprisingly, it has been observed that the terminal ester group at the tertiary carbon atom surprisingly reacts appreciably more rapidly than the ester groups at the other end of the chain or even in the chain at quaternary carbon atoms.

A molar ratio of polymethacrylate ester to HO—$R^2$—OH of 1:1 to 1:5 is particularly preferred.

The preferred temperature range of the transesterification is from 90° to 130° C.

Examples of polymethacrylate esters, which can be used for the inventive method, are poly(methyl methacrylate), poly(ethyl methacrylate), poly(n-butyl methacrylate), poly(i-butyl methacrylate), poly(t-butyl methacrylate), poly(n-octyl methacrylate), poly(2-ethyl hexyl methacrylate), poly(n-decyl methacrylate, poly(trifluoroethyl methacrylate) and poly(perfluorooctylethyl methacrylate).

Examples of glycols suitable for the trans-esterification reaction are ethylene glycol, 1,2- or 1,3-propylene glycol, 1,2-, 1,3- or 1,4-butylene glycol, neopentylene glycol, 1,6-hexamethylene glycol, 1,8-octamethylene glycol, 1,10-decamethylene glycol, 1,12-dodecamethylene glycol, 1,2-dihydroxycyclopentane, 1,2- or 1,4-dihydroxycyclohexane, 1,2-dihydroxymethylbenzene, diethylene glycol, triethylene glycol, polyethylene glycol, polypropylene glycol, polybutylene glycol, polyethylene oxide/polypropylene oxide glycols, 1,4-dihydroxy-2,3-butene, 1,4-dihydroxymethylbenzene.

Preferably, catalysts, known from the prior art, are used for the transesterification. Examples of such catalysts are alkyl titanate, such as butyl titanate or isopropyl titanate or the corresponding alkyl zirconates, furthermore stannates, such dialkyl tin acetate halide or dialkyl tin dialkyl esters, particularly dibutyl tin dilaurate, dibutyl tin diacetate and dibutyl tin acetate chloride. The catalysts are used in amounts of 0.5% to 2% by weight based on the polymethacrylate ester. Preferably, 0.5 to 1% by weight of catalyst are used.

Yet another object of the invention is the use of the compounds as the only or partial glycol components for the synthesis of polyesters and polyurethane, as well as for the modification of alkyl and epoxide resins. Since the inventive compounds very precisely have a functionality of 2, they function exclusively as chain-extending polymeric blocks. Gelling due to higher functionality or chain termination due to monofunctionality is not observed. It is thus possible to synthesize block polymers or block copolymers, such as polyesters or polyurethanes with polymethacrylate blocks, which have particularly advantageous application properties. It is also of interest that reactive resins can be modified with the inventive polymers. In this connection, alkyd resins and epoxide resins are named primarily. It is, of course, also possible to form derivatives with one or both terminal hydroxyl groups and to obtain compounds by these means, which can be used directly as such or represent reactive intermediates.

In the following Examples 1 A to 10 A, the synthesis (not of the invention) of the polymethacrylates, which serve as starting materials, is shown. Examples 1 B to 14 B serve to explain the inventive method.

In the Examples 1 C to 6 C, the use of the inventive α, ω-polymethacrylate glycols as polyols for the preparation of polyurethanes and polyesters is shown. These examples are provided by way of illustration and not by way of limitation.

EXAMPLE 1 A

Synthesis of an ω-Monohydroxy-Functional Polymethacrylate (Not of the Invention)

Toluene (400 g) is heated under pure nitrogen to 100° C. in a reactor. To this toluene, a solution of 2,950 g (approximately 29.5 moles) of methyl methacrylate, 249.6 g (approximately 3.2 moles) of β-mercaptoethanol and 9.6 g of azodiisobutyrodinitrile, dissolved in 400 g of toluene, is added at a constant rate within 280 minutes. After a post-reaction period of 75 minutes at 100° C., the reaction is terminated.

The product formed is subsequently freed from solvent and residual monomers by distillation at a temperature of 130° C. and a pressure of 10 torr; a highly viscous, transparent and slightly yellowish liquid remains behind.

Gel chromatographic analysis shows that the polymer obtained has a number average molecular weight $\overline{M}_n$ of 1150 and a weight average molecular weight $M_w$ of 1840; the nonuniformity coefficient U accordingly is 1.6. The molecular weight of 1120, determined by vapor phase osmometry ($\overline{M}_{n_{Osm}}$) together with the molecular weight of 1130 determined from the hydroxyl number $\overline{M}_{n_{OHZ}}$ show that the functionality is 0.99. The residual monomer content is less than 0.1%.

EXAMPLES 2 A TO 5 A

Synthesis of ω-Monohydroxy-Functional Polymethacrylates of Different Molecular Weights (Not of the Invention)

Basically, the method of Example 1 A is followed with the difference that, as is evident from Table 1, the amount of chain-transfer agent, the amount of initiator and the solids concentration are lowered and, in addition, before the fractionation, triethylene glycol dimethyl ether is added as additional solvent. Moreover, in order to improve the removal of the residual monomer and the separation of the solvent, a fractionation is carried out during which, if necessary, the boiling point is raised or the pressure lowered.

In addition to the nature and amount of the methacrylate used, the amounts of β-mercaptoethanol, azodiisobutyrodinitrile and of the toluene, xylene or triethylene glycol dimethyl ether solvent are given in Table 1. Furthermore, the number average and weight average molecular weights, determined by gel chromatographic analysis, and the corresponding nonuniformity coefficients, as well as the molecular weights obtained from vapor-pressure osmometry measurements and from the determination of the hydroxyl number and, finally, the functionalities calculated therefrom are also given in Table 1.

EXAMPLE 6 A

Synthesis of an ω-Monohydroxy-Functional Poly-n-Butyl Methacrylate (Not of the Invention)

Basically, the method of Example 1 A is followed with the difference that, instead of methyl methacrylate, 2,950 g (approximately 20.7 moles) of n-butyl methacrylate are used.

In addition to the nature and amount of the methacrylate used, the amounts of β-mercaptoethanol, azodiisobutyrodinitrile and of the toluene solvent are given in Table 1. Furthermore, the number average and weight average molecular weights, determined by gel chromatographic analysis, and the corresponding nonuniformity coefficients, as well as the molecular weights obtained from vapor-pressure osmometry measurements and from the determination of the hydroxyl number and, finally, the functionalities calculated therefrom are also given in Table 1.

EXAMPLE 7 A

Synthesis of an ω-Monohydroxy-Functional Poly-n-Butyl Methacrylate of Higher Molecular Weight (Not of the Invention)

Basically, the method of Example 6 A is followed, with the difference that, as is evident from Table 1, the amount of chain transfer agent, the amount of initiator and the solids concentration are lowered.

In addition to the nature and amount of the methacrylate used, the amounts of β-mercaptoethanol, azodiisobutyrodinitrile and the toluene solvent are given in Table 1. Furthermore, the number average and weight average molecular weights, determined by gel chromatographic analysis, and the corresponding nonuniformity coefficients, as well as the molecular weights obtained from vapor-pressure osmometry measurements and from the determination of the hydroxyl number and, finally, the functionalities calculated therefrom are also given in Table 1.

EXAMPLE 8 A

Synthesis of an ω-Monohydroxy-Functional Poly-2-Ethylhexyl Methacrylate (Not of the Invention)

Basically, the method of Example 1 A is followed with the difference that, instead of methyl methacrylate, 2,950 g (14.9 moles) of 2-ethylhexyl methacrylate are used. Furthermore, as is evident from Table 1, the amount of chain-transfer agent, the amount of initiator and the solids concentration are lowered and the distillation is carried out at temperatures of up to 150° C. and a pressure of 1 torr.

In addition to the nature and amount of the methacrylate used, the amounts of β-mercaptoethanol, azodiisobutyrodinitrile and the toluene solvent are given in Table 1. Furthermore, the number average and weight average molecular weights, determined by gel chromatographic analysis, and the corresponding nonuniformity coefficients, as well as the molecular weights obtained from vapor-pressure osmometry measurements and from the determination of the hydroxyl number and, finally, the functionalities calculated therefrom are also given in Table 1.

EXAMPLE 9 A

Synthesis of an ω-Monohydroxy-Functional Poly-2-Ethylhexyl Methacrylate of Higher Molecular Weight (Not of the Invention)

Basically, the method of Example 8 A is followed, with the difference that, as is evident from Table 1, the amount of chain-transfer agent, the amount of initiator and the solids concentration are lowered.

EXAMPLE 10 A

Synthesis of an ω-Monohydroxy-Functional Methyl Methacrylate/2-Ethylhexyl Methacrylate Copolymer (Not of the Invention)

Basically, the method of Example 8 A is followed with the difference that, instead of methyl methacrylate by itself, a 1:1 mixture of 990 g (approximately 9.9 moles) of methyl methacrylate and 1,960 g (approximately 9.9 moles) of 2-ethylhexyl methacrylate is used.

In addition to the nature and amount of the methacrylate used, the amounts of β-mercaptoethanol, azodiisobutyrodinitrile and of the xylene solvent are given in Table 1. Furthermore, the number average and weight average molecular weights, determined by gel chromatographic analysis, and the corresponding nonuniformity coefficients, as well as the molecular weights obtained from vapor-pressure osmometry measurements and from the determination of the hydroxyl number and, finally, the functionalities calculated therefrom are also given in Table 1.

TABLE 1

| Example No. | Methacrylate Type | Amount (g)/(Mole) | (g)/(Moles) | ADBN (g) | Solvent Type/Amount (g) | $M_w$ GPC | $M_n$ GPC | U | $M_n$ Osm | $M_w$ OHZ | f |
|---|---|---|---|---|---|---|---|---|---|---|---|
| 1 A | MMA | 2950/29.5 | 250/3.2 | 9.6 | TL/800 | 1840 | 1150 | 1.6 | 1120 | 1130 | 0.99 |
| 2 A | MMA | 2950/29.5 | 125/1.6 | 6.3 | TL/800 | 4160 | 2310 | 1.8 | 2350 | 2430 | 0.98 |
| 3 A | MMA | 2950/29.5 | 50/0.64 | 4.4 | TLTG/3000 | 12600 | 5260 | 2.4 | 5500 | 5670 | 0.97 |
| 4 A | MMA | 2950/29.5 | 12.5/0.32 | 3.0 | TLTG/4000 | 29100 | 10400 | 2.8 | 10800 | 11400 | 0.95 |
| 5 A | MMA | 2950/29.5 | 5/0.064 | 3.0 | TLTG/12000 | 164000 | 53000 | 31 | — | — | — |
| 6 A | BMA | 2950/20.7 | 250/3.2 | 9.6 | TL/800 | 1750 | 1170 | 1.5 | 1140 | 1150 | 0.99 |
| 7 A | BMA | 2950/20.7 | 125/1.6 | 6.3 | XY/800 | 4300 | 2530 | 1.7 | 2300 | 2350 | 0.98 |
| 8 A | EHMA | 2950/14.9 | 250/3.2 | 9.6 | TL/800 | 1800 | 1200 | 1.5 | 1170 | 1180 | 0.99 |
| 9 A | EHMA | 2950/14.9 | 125/1.6 | 6.3 | XY/800 | 4100 | 2300 | 1.8 | 2350 | 2420 | 0.97 |
| 10 A | MMA/EHMA | 990/9.9/ 1969.9 | 250/3.2 | 9.6 | XY/800 | 1900 | 1180 | 1.6 | 1150 | 1170 | 0.98 |

Legend:
MMA = Methyl methacrylate
BMA = n-Butyl methacrylate
EHMA = 2-Ethylhexyl methacrylate
ADBN = Azodiisobutyrodinitrile
TL = Toluene
XY = Xylene
TLTG = Mixture of toluene/triethylene glycol dimethyl ether (1:1)
U = Nonuniformity coefficient
f = functionality In addition to the nature and amount of the methacrylate used, the amounts of β-mercaptoethanol, azodiisobutyrodinitrile and the xylene solvent are given in Table 1. Furthermore, the number average and weight average molecular weights, determined by gel chromatographic analysis, and the corresponding nonuniformity coefficients, as well as the molecular weights obtained from vapor-pressure osmometry measurements and from the determination of the hydroxyl number and, finally, the functionalities calculated therefrom are also given in Table 1.

EXAMPLE 1 B

Synthesis of an α, ω-Dihydroxy-Functional Polymethacrylate By Transesterification of the Polymer with 1,4-Butylene Glycol in the Molar Ratio of 1:5 (Of the Invention)

The α-hydroxy-functional poly(methyl methacrylate) of Example 1 A (1,120 g, approximately 1 mole), dissolved in 350 g of toluene, is freed from solvent by distillation in a reactor. Subsequently, 450 g (approximately 5 moles) of 1,4-butylene glycol and 11.2 g of isopropyl titanate are added. The reaction is carried out at a temperature of 130° C. and a pressure of 5 torr, the resulting methanol being removed from the 1,4-butylene glycol by fractionation and condensed in two cold traps connected in series. The reaction is concluded after about 4 hours, the end of the reaction being indicated by the cessation of the evolution of methanol.

The resulting crude product is mixed with 90 g of a 20% aqueous solution of $NaH_2PO_4$ and then washed 4 times with 500 g of a 20% aqueous solution of NaCl, the supernatant 1,4-butylene glycol and the catalyst being removed. Finally, the product is dried at a temperature 150° C. and a pressure 10 torr by distillation, taken up in 1,000 g of toluene and filtered. The solvent is removed once again by distillation, the residue remaining having a 1,4-butylene glycol content of less than 0.1%.

Gel chromatographic analysis shows that the polymer obtained has a number average molecular weight $\overline{M}_n$ of 1,220 and a weight average molecular weight $\overline{M}_w$ of 1,950; the nonuniformity coefficient therefore is 1.6. The molecular weight of 1180 obtained by vapor pressure osmometry ($\overline{M}_{n_{Osm}}$) together with the molecular weight of 1186 obtained from the hydroxyl number $\overline{M}_{w_{OHZ}}$ indicates a functionality of 1.99.

The use of the "Matrix Assisted Laser Absorption Ionization Mass Spectroscopy (MALDI-MS)" as a method for determining the absolute molecular weights gives a homologous series of molecular weights from n*100+159 which, after subtracting the molecular weight of the absorbed sodium ion, corresponds to the exact molecular weight of the monomeric α, ω-dihydroxy-functional polymethacrylate. In addition, a homologous series of the dimers with molecular weights of 2n*100+405 is visible in, however, lower concentration; here also, the molecular weight of the sodium ion must be taken into consideration.

EXAMPLE 2 B

Synthesis of an α, ω-Difunctional Polymethacrylate

By the Polymer-like Transesterification of ω-Monohydroxy-Functional Poly(Methyl Methacrylate) with 1,4-Butylene Glycol in the Molar Ratio of 1:1 (Of the Invention)

Basically, the method of Example 1 B is followed with the difference that, instead of 5 moles, 1 mole of 1,4-butylene glycol is used.

Aside from the ω-monohydroxy-functional polymethacrylate used for the transesterification, the nature and molar ratio of the glycols used (glycol/polymethacrylate), the reaction conditions, the amount of catalyst, which is used in each case in an amount of 1% by weight, based on the total weight of the reaction mixture, and the amount of toluene used are given in Table 2. In addition, the corresponding analytical data are given.

EXAMPLES 3 B TO 6 B

Synthesis of α, ω-Difunctional Poly(Methyl Methacrylates) of Different Molecular Weights (Of the Invention)

Basically, the method of Example 1 B is followed with the difference that the ω-monohydroxy-functional poly(methyl methacrylates) from Examples 2 A to 5 A are reacted in each case in the molar ratio of 1:5 with 1,4-butylene glycol.

Moreover, instead of toluene, a mixture of toluene and triethylene glycol dimethyl ether is used as solvent and the solvent and the toluene is fractionated in order to remove traces of water.

Aside from the ω-monohydroxy-functional polymethacrylate used for the transesterification, the nature and molar ratio of the glycols used (glycol/polymethacrylate), the reaction conditions, the amount of catalyst, which is used in each case for 1% by weight, based on the total weight of the reaction mixture, and the nature and amount of solvent used are given in Table 2. In addition, the corresponding analytical data are given.

EXAMPLES 7 B TO 9 B

Synthesis of α, ω-Difunctional Poly(Methyl Methacrylates) Using Different Glycols (Of the Invention)

Basically, the method of Example 1 B is followed, with the difference that, as is evident from Table 2, instead of 1,4-butylene glycol, various glycols (1,6-hexamethylene glycol, 1,4-cyclohexamethylene glycol and triethylene glycol) are used in a molar ratio of 1:5.

Aside from the ω-monohydroxy-functional polymethacrylate used for the transesterification, the nature and molar ratio of the glycols used (glycol/polymethacrylate), the reaction conditions, the amount of catalyst, which is used in each case in an amount of 1% by weight, based on the total weight of the reaction mixture, and the amount of toluene used are given in Table 2. In addition, the corresponding analytical data are given.

EXAMPLE 10 B

Synthesis of α, ω-Difunctional Poly(n-Butyl Methacrylate) (Of the Invention)

Basically, the method of Example 1 B is followed, with the difference that, instead of the polymethacrylate of Example 1 A, that of Example 6 A is used.

Aside from the ω-monohydroxy-functional polymethacrylate used for the transesterification, the nature and molar ratio of the glycols used (glycol/polymethacrylate), the reaction conditions, the amount of catalyst, which is used in each case in an amount of 1% by weight, based on the total weight of the reaction mixture, and the amount of toluene used are given in Table 2. In addition, the corresponding analytical data are given.

EXAMPLE 11 B

Synthesis of α, ω-Difunctional Poly-n-Butyl Methacrylate of Higher Molecular Weight (Not of the Invention)

Basically, the method of Example 10 B is followed with the difference that, instead of the polymethacrylate of Example 6 A, that of Example 7 A is used.

Aside from the ω-monohydroxy-functional polymethacrylate used for the transesterification, the nature and molar ratio of the glycols used (glycol/polymethacrylate), the reaction conditions, the amount of catalyst, which is used in each case in an amount of 1% by weight, based on the total weight of the reaction mixture, and the amount of xylene used are given in Table 2. In addition, the corresponding analytical data are given.

EXAMPLE 12 B

Synthesis of α, ω-Difunctional Poly-2-Ethylhexyl Methacrylate (Of the Invention)

Basically, the method of Example 1 B is followed with the exception that, instead of the polymethacrylate from Example 1 A, that of Example 8 A is used.

Aside from the ω-monohydroxy-functional polymethacrylate used for the transesterification, the nature and molar ratio of the glycols used (glycol/polymethacrylate), the reaction conditions, the amount of catalyst, which is used in each case in an amount of 1% by weight, based on the total weight of the reaction mixture, and the amount of toluene used are given in Table 2. In addition, the corresponding analytical data are given.

Aside from the ω-monohydroxy-functional polymethacrylate used for the transesterification, the nature and molar ratio of the glycols used (glycol/polymethacrylate), the reaction conditions, the amount of catalyst, which is used in each case in an amount of 1% by weight, based on the total weight of the reaction mixture, and the amount of xylene used are given in Table 2. In addition, the corresponding analytical data are given.

TABLE 2

| Example No. | Polymethacrylate of Example No. | Amount (g) | Glycol Type/M.R. Amount (g) | Reaction Conditions Temp. (° C.) | Time (h) | IPT Amount (g) | Solvent Type/Amount (g) | $\overline{M}_n$ GPC | $\overline{M}_w$ GPC | U | $\overline{M}_n$ Osm | $\overline{M}_n$ OHZ | f |
|---|---|---|---|---|---|---|---|---|---|---|---|---|---|
| 1 B | 1 A | 1120 | BD/5/450 | 130 | 4 | 11.2 | TL/350 | 1220 | 1950 | 1.6 | 1180 | 1186 | 1.99 |
| 2 B | 1 A | 1120 | BD/1/90 | 130 | 4 | 11.2 | TL/350 | 1970 | 3350 | 1.7 | 1880 | 1958 | 1.92 |
| 3 B | 2 A | 2350 | BD/5/450 | 130 | 5 | 23.5 | TL/350 | 2630 | 4730 | 1.8 | 2480 | 2530 | 1.96 |
| 4 B | 3 A | 1100 | BD/5/90 | 130 | 5 | 11 | TLTG/1100 | 5730 | 13750 | 2.4 | 5620 | 5790 | 1.94 |
| 5 B | 4 A | 1080 | BD/7/63 | 130 | 8 | 11 | TLTG/1350 | 10900 | 30500 | 2.8 | 11100 | 11380 | 1.95 |
| 6 B | 5 A | 1000 | BD/10/17 | 130 | 10 | 10 | TLTG/4000 | 53000 | 165000 | 3.1 | — | 56000 | 1.89 |
| 7 B | 1 A | 1120 | HD/5/590 | 130 | 5 | 11 | TL/350 | 1230 | 1970 | 1.6 | 1190 | 1178 | 2.02 |
| 8 B | 1 A | 1120 | CD/5/580 | 130 | 8 | 11 | TL/350 | 1310 | 2100 | 1.6 | 1200 | 1230 | 1.95 |
| 9 B | 1 A | 1120 | TEG/3/450 | 120 | 10 | 11 | TL/350 | 1350 | 2160 | 1.6 | 1260 | 1279 | 1.97 |
| 10 B | 6 A | 1140 | BD/5/450 | 130 | 6 | 11 | TL/350 | 1320 | 1980 | 1.5 | 1210 | 1198 | 2.02 |
| 11 B | 7 A | 2300 | BD/5/450 | 130 | 6 | 23 | XY/350 | 2820 | 4794 | 1.7 | 2640 | 2670 | 1.98 |
| 12 B | 8 A | 1170 | BD/5/450 | 130 | 8 | 12 | TL/350 | 1340 | 2010 | 1.5 | 1250 | 1275 | 196 |
| 13 B | 9 A | 2350 | BD/5/450 | 130 | 8 | 24 | XY/700 | 2610 | 4700 | 1.8 | 2480 | 2560 | 1.94 |
| 14 B | 10 A | 1150 | BD/5/450 | 130 | 8 | 12 | XY/350 | 1320 | 2110 | 1.6 | 1240 | 1258 | 1.97 |

Legend:
M.R. = Molar Ratio glycol/monool
U = Nonuniformity coefficient
f = functionality
BD = 1,4-Butylene glycol
HD = 1,6-Hexamethylene glycol
CD = 1,4-Cyclohexamethylene glycol
TEG = Triethylene glycol
IPT = Isopropyl titanate
TL = Toluene
XY = Xylene
TLTG = Mixture of toluene/triethylene glycol dimethyl ether (1:1)

EXAMPLE 13 B

Synthesis of α, ω-Difunctional Poly-2-Ethylhexyl Methacrylate of Higher Molecular Weight (Of the Invention)

Basically, the method of Example 12 B is followed, with the difference that, instead of the polymethacrylate of Example 8 A, that of Example 9 A is used.

Aside from the ω-monohydroxy-functional polymethacrylate used for the transesterification, the nature and molar ratio of the glycols used (glycol/polymethacrylate), the reaction conditions, the amount of catalyst, which is used in each case in an amount of 1% by weight, based on the total weight of the reaction mixture, and the amount of xylene used are given in Table 2. In addition, the corresponding analytical data are given.

EXAMPLE 14 B

Synthesis of an α, ω-Difunctional Methyl Methacrylate/2-Ethylhexyl Methacrylate Copolymer (Of the Invention)

Basically, the method of Example 1 B is followed, with the difference that, instead of the polymethacrylate of Example 1 A, that of Example 10 A is used.

EXAMPLE 1 C

Preparation of a Poly(Methyl Methacrylate)/ Polyurethane (Of the Invention)

In a reactor equipped with a stirrer, 118 g (approximately 0.1 mole) of the α, ω-difunctional poly(methyl methacrylate) from Example 1 B, dissolved in 118 g of toluene, are freed from traces of water by largely removing the toluene by distillation at a temperature of 100° C. and a pressure of 10 torr. Thereafter, the solution is brought back to the original volume by the addition of a mixture of methyl ethyl ketone, dimethylforamide and toluene in a ratio by weight of 25:35:40, a solids content of about 50% by weight being attained. After the solution obtained is heated to 80° C., first 0.1 g of dibutyl tin dilaurate as catalyst and then, over a period of 15 minutes, 13.4 g (approximately 0.08 moles) of hexamethylene diisocyanate are added under pure nitrogen. At the end of about 4 hours, the isocyanate value is determined to be zero and the reaction is concluded.

A clear, colorless and moderately viscous solution is obtained. From the hydroxyl number of the product obtained, the molecular weight ($\overline{M}_{w_{OHZ}}$) is determined to be 6,500. Gel chromatographic analysis shows the number average molecular weight ($\overline{M}_n$) to be 7,200 and the weight average molecular weight ($\overline{M}_w$) to be 17,300; the nonuniformity coefficient therefore is 2.4.

EXAMPLES 2 C AND 3 C

Synthesis of Poly(Methyl Methacrylate)/ Polyurethanes of Different Molecular Weights (Of the Invention)

The method of Example 1 C is followed with the difference that the molar ratio of α, ω-difunctional poly(methyl methacrylate) to hexamethylene diisocyanate is decreased, as indicated in Table 3. Moreover, as also stated, the solids content is decreased.

The molecular weights, determined from the hydroxyl number and gel permeation chromatography, are given in Table 3.

EXAMPLES 4 C AND 5 C

Preparation of Polyurethanes with Poly-n-Butyl and Poly-2-Ethylhexyl Methacrylate Segments (Of the Invention)

The method of Example 1 C is followed with the difference that, instead of α, ω-difunctional poly(methyl methacrylate), α, ω-poly-n-butyl or poly-2-ethylhexyl methacrylate glycol is used.

The molecular weights, determined from the hydroxyl number and from gel permeation chromatography, are given in Table 3.

A clear, slightly yellowish and moderately viscous solution is obtained. From the hydroxyl number of the product obtained, the molecular weight $\overline{M}_{w_{OHZ}}$ is determined to be 6,300. Gel chromatographic analysis indicates a number average molecular weight ($\overline{M}_n$) of 6,800 and a weight average molecular weight ($\overline{M}_w$) of 15,600; the nonuniformity coefficient therefore is 2.3.

We claim:

1. α,ω-polymethacrylate glycols of the general formula

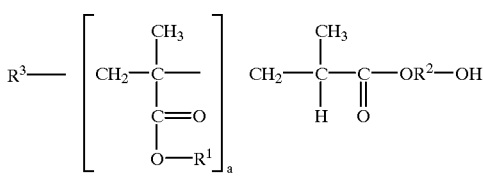

wherein
$R^1$ is an optionally halogenated alkyl group with 1 to 10 carbon atoms,
$R^2$
(1) is a divalent, aliphatic, optionally unsaturated hydrocarbon group with 2 to 20 carbon atoms, a cycloaliphatic hydrocarbon group with 5 to 10 carbon atoms or an aliphatic-aromatic hydrocarbon group with 8 to 20 carbon atoms,
(2) a divalent, aliphatic ether group —$R^5$—O—$R^6$, the $R^5$ and $R^6$ groups of which together have 4 to 20 carbon atoms, or
(3) a polyether group of the general formula —$(C_nH_{2n}O)_m$—$C_pH_{2p}$, wherein the subscript n has a value of 2 to

TABLE 3

| | PMA Glycol from | | | | HDI | | | | | |
|---|---|---|---|---|---|---|---|---|---|---|
| Example No. | Example No. | Amount (g) | Amount (g) | Molar Ratio (Glycol/HDI) | Solids (%) | $M_n$ OHZ | $M_n$ GPC | $M_w$ GPC | U |
| 1 C | 1 B | 118 | 13.4 | 5/4 | 50 | 6500 | 7200 | 17300 | 2.4 |
| 2 C | 1 B | 118 | 15.1 | 10/9 | 40 | 13000 | 15100 | — | — |
| 3 C | 1 B | 118 | 16.0 | 20/19 | 35 | 26000 | 31000 | — | — |
| 4 C | 10 B | 112 | 16.0 | 20/19 | 40 | 28000 | 24500 | — | — |
| 5 C | 13 B | 256 | 15.1 | 10/9 | 50 | 26000 | 22500 | — | — |

HDI = Hexamethylene diisocyanate
U = Nonuniformity coefficient

EXAMPLE 6 C

Preparation of a Poly(Methyl Methacrylate) Polyester (Not of the Invention)

In a reactor equipped with a stirrer, 118 g (approximately 0.1 mole) of the α, ω-poly(methyl methacrylate) glycol from Example 1 B, dissolved in 118 g of toluene, is freed from traces of water by largely removing the toluene by distillation at a temperature 100° C. and a pressure of 10 torr. The original volume of the solution is restored by the addition of dried toluene, the solids content being adjusted to approximately 50% by weight. The solution obtained is heated to 40° C. and 14.6 g (approximately 0.08 moles) of adipyl dichloride, corresponding to a molar ratio of glycol to di-acid chloride of 5:4 is added dropwise under pure nitrogen within a period of 10 minutes. Subsequently, the temperature is raised to the refluxing temperature of 110° C., nitrogen being passed through simultaneously in order to remove the hydrogen chloride formed. At the end of about 4 hours, the acid number is determined to be about 1, indicating that the reaction in completed.

4, the subscript m a value of not less than 1 and the subscript p a value of 2, 3 or 4,
$R^3$ is a residue of a chain transfer agent having a terminal hydroxyl group and is selected from the group consisting of —S—$CH_2CH_2$—OH, —S—$CH_2CH_2CH_2CH_2$—OH, —S—$CH_2CH_2CH_2CH_2CH_2CH_2$—OH and —S—$CH_2$—$C_6H_4$—$CH_2OH$ group, and
a has a value of not less than 4.

2. α,ω-polymethacrylate glycols of the formula

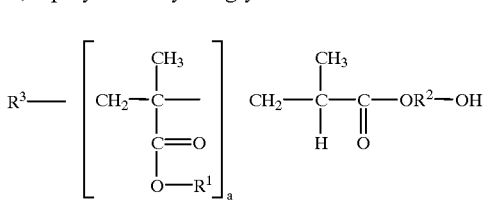

$R^1$ is an optionally halogenated alkyl group with 1 to 10 carbon atoms,
$R^2$ (1) is a divalent, aliphatic, optionally unsaturated hydrocarbon group with 2 to 20 carbon atoms, a cycloaliphatic hydrocarbon group with 5 to 10 carbon atoms or an aliphatic-aromatic hydrocarbon group with 8 to 20 carbon atoms, (2) a divalent, aliphatic ether group $-R^5-O-R^6$, the $R^5$ and $R^6$ groups of which together have 4 to 20 carbon atoms, or (3) a polyether group of the general formula $-(C_nH_{2n}O)_m-C_pH_{2p}$, wherein the subscript n has a value of 2 to 4, the subscript m a value of not less than 1 and the subscript p a value of 2, 3 or 4, $R^3$ is a residue of a chain transfer agent having a terminal hydroxyl group and is selected from the group of $-S-CH_2CH_2-OH$, $-S-CH_2CH_2CH_2CH_2-OH$, and a has a value of not less than 4, obtained by reacting polymethacrylate esters of a general formula

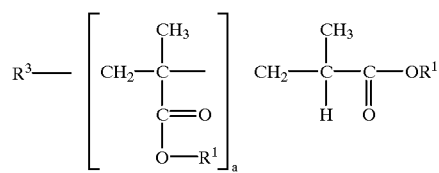

which are obtained by free radical polymerization in presence of a chain-length regulator and wherein the $R^1$ and the $R^3$ groups and the subscript a have the meanings already given, with a glycol having the formula $HO-R^2-OH$ at a temperature of between about 70° to 140° C., in the presence of a non-basic transesterification catalyst and optionally a solvent and removing the unreacted glycol by distillation or by washing it out with a solvent in which the glycol is soluble and the polymer is insoluble.

* * * * *